(12) United States Patent
Eguchi

(10) Patent No.: US 8,630,066 B2
(45) Date of Patent: Jan. 14, 2014

(54) HARD DISK DRIVE INCLUDING A MICROMOTION ACTUATOR AND A DAMPING UNIT

(75) Inventor: Takehiko Eguchi, Mito (JP)

(73) Assignee: Hitachi, Ltd., Tokyo (JP)

( * ) Notice: Subject to any disclaimer, the term of this patent is extended or adjusted under 35 U.S.C. 154(b) by 251 days.

(21) Appl. No.: 13/151,329

(22) Filed: Jun. 2, 2011

(65) Prior Publication Data

US 2011/0299197 A1    Dec. 8, 2011

(30) Foreign Application Priority Data

Jun. 4, 2010   (JP) ................................ 2010-128850

(51) Int. Cl.
*G11B 5/58*      (2006.01)
*G11B 21/10*     (2006.01)
*G11B 21/21*     (2006.01)

(52) U.S. Cl.
USPC .................. 360/294.3; 360/294.4; 360/294.6; 360/244.5

(58) Field of Classification Search
USPC .......... 360/294.1, 294.3, 294.4, 294.6, 244.2, 360/244.5
See application file for complete search history.

(56) References Cited

U.S. PATENT DOCUMENTS

| | | | |
|---|---|---|---|
| 7,477,489 B1 * | 1/2009 | Chen et al. .................. | 360/294.4 |
| 8,089,732 B2 * | 1/2012 | Yao et al. .................... | 360/245.3 |
| 8,149,545 B1 * | 4/2012 | Chai et al. .................. | 360/294.3 |
| 8,310,790 B1 * | 11/2012 | Fanslau, Jr. ................. | 360/294.4 |
| 2007/0223146 A1 * | 9/2007 | Yao et al. .................... | 360/294.4 |
| 2009/0086378 A1 * | 4/2009 | Huang et al. ............... | 360/294.4 |
| 2009/0147407 A1 * | 6/2009 | Huang et al. ............... | 360/294.4 |

FOREIGN PATENT DOCUMENTS

| | | |
|---|---|---|
| JP | 2001-307442 | 11/2001 |
| JP | 3771076 | 2/2006 |
| JP | 2006-190452 | 7/2006 |
| JP | 2007-090220 | 4/2007 |

OTHER PUBLICATIONS

Office Action issued in corresponding Japanese Appln No. 2010-128850, mailed Sep. 11, 2012.

* cited by examiner

*Primary Examiner* — Jefferson Evans
(74) *Attorney, Agent, or Firm* — Antonelli, Terry, Stout & Kraus, LLP.

(57) ABSTRACT

In a hard disk drive, for the purpose of solving a problem that a mass of the tip of a VCM actuator increases, a primary resonance frequency lowers and a control band lowers in a case where a balance driving mechanism which damps a vibration during the driving of a microactuator is mounted, a damping unit using a displacement enlargement mechanism by resonance is disposed to obtain a sufficient damping effect with a small mass, thereby setting a resonance frequency of the damping unit to be higher than a frequency of a resonance peak of a damping object. The hard disk drive includes a micromotion actuator for micromotion displacement which drives a head-gimbal assembly, and a micromotion actuator for damping which drives the damping unit so that the micromotion displacement direction of a magnetic head and the displacement direction of a mount portion have opposite phases.

2 Claims, 8 Drawing Sheets

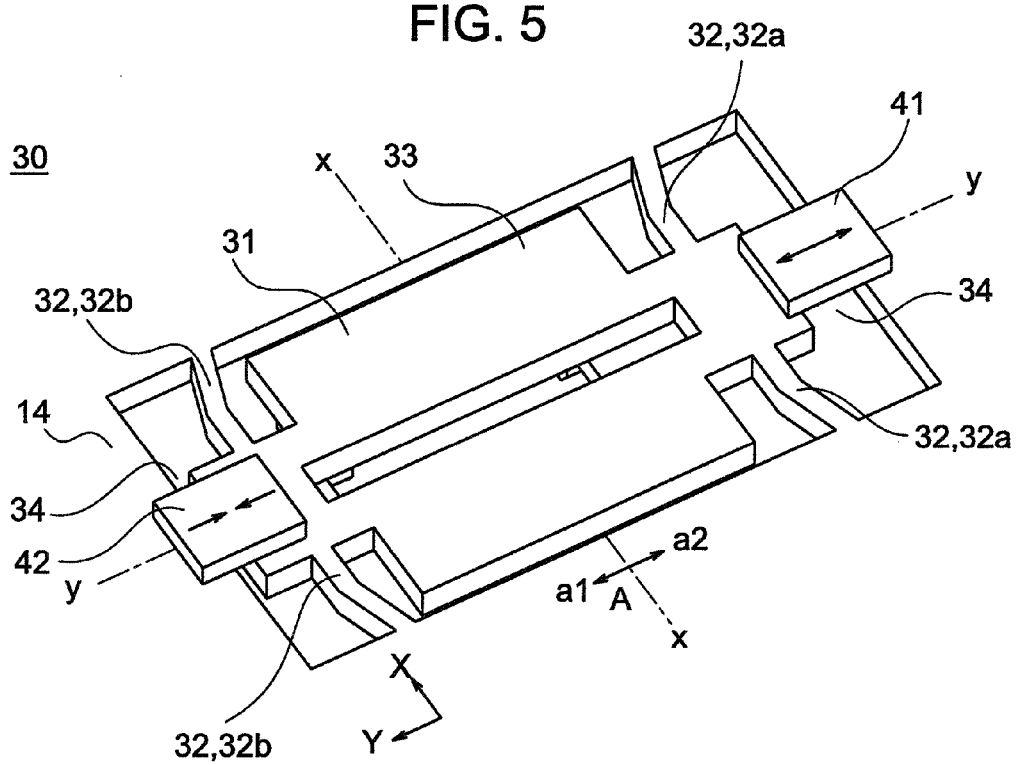
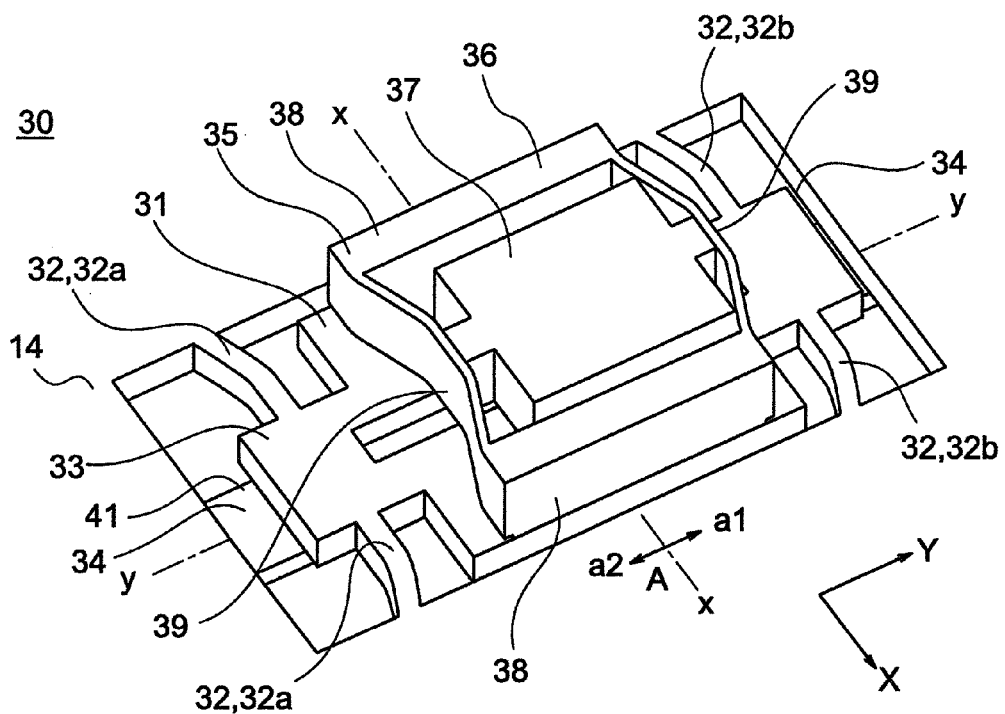

HARD DISK DRIVE INCLUDING A MICROMOTION ACTUATOR AND A DAMPING UNIT

FIELD OF THE INVENTION

The present invention relates to a hard disk drive including a head positioning mechanism of a two-stage actuator system having a VCM actuator and an actuator for micromotion mounted on the side of the tip of the VCM actuator, and more particularly, it relates to a hard disk drive including a damping mechanism which contributes to the enhancement of a positioning precision of a magnetic head.

DESCRIPTION OF RELATED ART

A hard disk drive includes a magnetic disk which is an information recording medium, a magnetic head which reads and writes magnetic information from and in the magnetic disk, and a voice coil motor (VCM) actuator which supports the magnetic head and moves the magnetic head to a predetermined radial position on the magnetic disk. In the hard disk drive, for the purpose of correctly reading and writing the magnetic information from and in the magnetic disk, it is necessary to precisely control the positioning of the magnetic head with respect to the magnetic disk. As to the positioning control of the magnetic head, with the increase of a recording capacity/recording density of the hard disk drive, a mechanism and a control method for realizing a higher positioning precision are required.

To meet this requirement, there has been suggested a head positioning mechanism of a two-stage actuator system including, in addition to the VCM actuator, a microactuator (an actuator for micromotion) which finely moves the magnetic head in such a direction as to intersect with a track direction of the magnetic disk, thereby precisely positioning the magnetic head. When the recording capacity/recording density of the hard disk drive progressively increases so that a recording capacity of 500 GB or more can be realized with a disk, as the head positioning mechanism corresponding to the capacity, there has increased a need for a precise head positioning mechanism of the two-stage actuator system.

As an example of the actuator for micromotion in such a head positioning mechanism of the two-stage actuator system, JP-A-2001-307442 discloses that a VCM actuator includes a piezoelectric element mount portion disposed between a load beam of the actuator and a carriage which supports this load beam, and two piezoelectric elements are arranged on this piezoelectric element mount portion substantially symmetrically with respect to a central axis of a suspension in a longitudinal direction. In this head positioning mechanism, during driving, a voltage signal is applied to the two piezoelectric elements to expand and contract the piezoelectric elements in opposite phases, and in response to the expansion and contraction, the suspension including the magnetic head mounted on a tip thereof is finely moved, whereby the actuator for micromotion precisely positions the magnetic head.

Moreover, one or two magnetic heads are usually mounted on an arm of the VCM actuator of the hard disk drive. On the arm of the VCM actuator disposed between two magnetic disks, two magnetic heads are mounted so that the magnetic information is read and written from and in magnetic recording surfaces which are present above and under the arm, respectively. On the other hand, one magnetic head is mounted on the arm of the VCM actuator disposed with respect to the magnetic recording surface of the magnetic disk at the uppermost or lowermost end of the hard disk drive, because the actuator only has one corresponding magnetic recording surface.

JP-B-3771076 discloses a head positioning mechanism of a two-stage actuator system in which for the purpose of improving frequency response characteristics at a position of a magnetic head during the driving of an actuator for micromotion, enhancing a positioning control band and realizing a more precise positioning performance, an arm of a VCM actuator is disposed between two magnetic disks and includes two mounted magnetic heads, while an actuator for micromotion drives a suspension including one mounted magnetic head, so that respective suspensions are driven in opposite phases. Furthermore, in this publication, with respect to an arm of a VCM actuator disposed to face the magnetic recording surface of a magnetic disk at the uppermost or lowermost end thereof, and including one mounted magnetic head, there is disclosed a constitution in which on the surface of the arm opposite to a magnetic disk side surface to which a suspension including one mounted magnetic head is attached, a balance driving mechanism is mounted. The balance driving mechanism includes a microactuator having a constitution similar to the actuator for micromotion which finely moves the suspension, and a mass member (a dummy mass) which has a mass equivalent to that of the suspension including the mounted magnetic head and finely moves by the driving of this microactuator. In the arm of the VCM actuator including this balance driving mechanism and the one mounted magnetic head, the microactuators of the suspension and the balance driving mechanism are driven in the opposite phases to each other, respectively, whereby it is possible to obtain an effect similar to that of the arm of the VCM actuator on which two magnetic heads are mounted.

In the head positioning mechanism of the two-stage actuator system, in frequency characteristics of a head response during the driving of the microactuator, there appears a peak as a minimum order frequency peak corresponding to a vibration mode referred to as a sway mode in which the arm and the suspension are deformed in the operation surface of the microactuator. In the head positioning mechanism of the two-stage actuator system disclosed in the publication, when two magnetic heads mounted on the arm of the VCM actuator or one magnetic head and the dummy mass mounted on the arm are driven in the opposite phases to each other, it is possible to compensate the above minimum order frequency peak so as to cancel it. In consequence, the sway mode enhances up to a peak frequency at which a minimum order resonance peak next appears, and enhancement of frequency characteristics of a head response in a control band can be realized.

Meanwhile, when the magnetic head can precisely be positioned by the above head positioning mechanism of the two-stage actuator system, a large capacity of 500 GB or 1 TB can be realized only with one disk. In consequence, in a personal computer or the like which occupies a large ratio of a use application of the hard disk drive, a sufficiently necessary recording capacity can be acquired by the hard disk drive on which only one disk is mounted. Therefore, it is considered that a demand for the hard disk drive including one disk is growing.

In this head positioning mechanism of the hard disk drive including the one disk, the arm of the VCM actuator including one mounted magnetic head is disposed on the upper surface and/or the lower surface of the disk.

Therefore, when the head positioning mechanism of the two-stage actuator system is applied to the head positioning mechanism of the hard disk drive including one disk, the balance driving mechanism and the head positioning mechanism of the two-stage actuator system are mounted on each arm of the VCM actuator on which one magnetic head is mounted. In this case, a mass of the balance driving mechanism disposed in each arm of the VCM actuator is substantially the same as a mass of the suspension including the mounted magnetic head and the microactuator which drives the suspension. In consequence, the mass of the tip of each arm of the VCM actuator on which one magnetic head is mounted increases twice as compared with a case where any balance driving mechanism is not mounted.

However, owing to the increase of the mass of the arm tip of this VCM actuator, a primary resonance frequency of the VCM actuator which is an actuator for coarse motion is lowered, and the control band is decreased. To further improve the positioning precision of the positioning mechanism of the two-stage actuator system, it is necessary to enhance the control band of both the microactuator and the VCM actuator. Therefore, the enhancement of the resonance frequency characteristics of the VCM actuator has been an important theme in the same manner as in the enhancement of frequency characteristics of a vibration of the microactuator.

BRIEF SUMMARY OF THE INVENTION

The present invention has been developed in view of the above theme, and an object thereof is to provide a hard disk drive which enhances a control band of both a microactuator and a VCM actuator, thereby further improving a positioning precision of a positioning mechanism of a two-stage actuator system.

To achieve the above object, a hard disk drive according to the present invention realizes the enhancement of frequency characteristics of an actuator which displaces and drives a magnetic head, by use of a damping unit having a small mass. For this purpose, the hard disk drive of the present invention comprises a damping unit including a resonator in which a mass member is elastically supported to be displaced in a predetermined direction, a base portion in which a mount portion including the mounted resonator is elastically supported to be displaced in the predetermined direction and a micromotion actuator for damping which displaces and drives the mount portion of the base portion in the predetermined direction. The damping unit is disposed in an arm on which a magnetic head is mounted so that the predetermined direction of the damping unit becomes the same as a micromotion displacement direction of a magnetic head by a head positioning mechanism of a two-stage actuator system, and a micromotion actuator for the micromotion displacement of the magnetic head and the micromotion actuator for the damping of the damping unit are operated, respectively, so that the micromotion direction of the magnetic head and the displacement direction of the mount portion on which the resonator is mounted have opposite phases.

Furthermore, the present invention may be characterized in that a resonance frequency of a vibration system of the resonator including the mass member and an elastic support member of the mass member is set to be higher than a frequency (also referred to as the control frequency) of a resonance peak which is an object of compensation by the damping unit.

According to the present invention, for the purpose of compensating for vibration generated by the driving of the micromotion actuator for the micromotion displacement of the magnetic head, the micromotion actuator for the damping of the damping unit displaces and drives the mass member of the resonator in the damping unit in the opposite phase. At this time, in the mass member of the resonator, the deformation of the elastic support member by resonance is added to the displacement of the mount portion which is displaced and driven by the micromotion actuator for the damping in the opposite phase, whereby the mass member is more noticeably displaced, so that the damping unit can obtain a sufficient effect with a small mass. In consequence, the mass of the damping unit can be decreased, and hence as compared with a case where a dummy mass having a mass equivalent to that of a suspension is used, the mass of an arm tip can be decreased, and a primary resonance frequency of the VCM actuator can be enhanced. Therefore, a control band of both the microactuator and the VCM actuator enhances.

Other objects, features and advantages of the invention will become apparent from the following description of the embodiments of the invention taken in conjunction with the accompanying drawings.

BRIEF DESCRIPTION OF SEVERAL VIEWS OF THE DRAWING

FIG. 5 is an operation explanatory view of the damping unit shown in FIG. 3;

FIG. 6 is an operation explanatory view of the damping unit shown in FIG. 4;

DETAILED DESCRIPTION OF THE INVENTION

Figure 1:
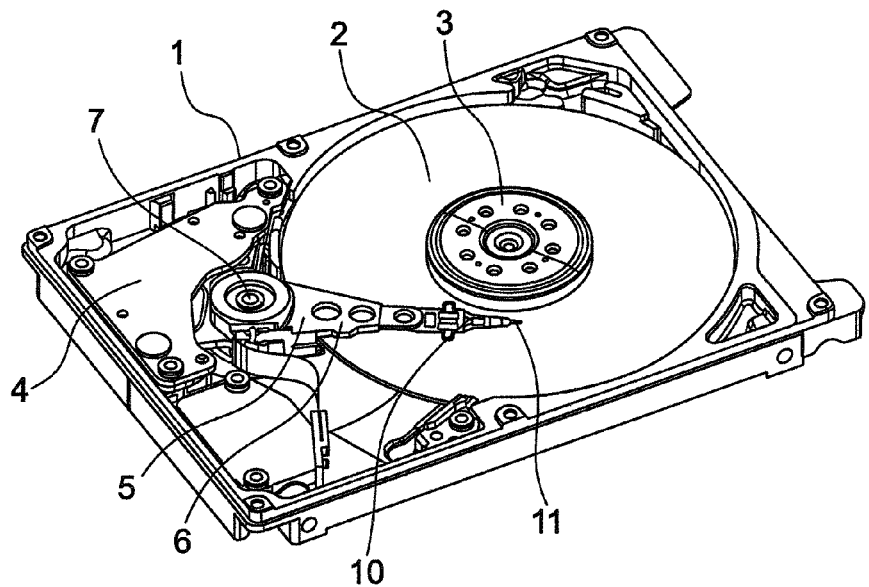
FIG. 1 is a perspective view of a hard disk drive according to an embodiment of the present invention.

Hereinafter, a hard disk drive according to an embodiment of the present invention will be described with reference to the drawing.

FIG. 1 is a perspective view of the hard disk drive according to the embodiment of the present invention. It is to be noted that in FIG. 1, the hard disk drive has a state where a lid member is removed to see the inside of a housing.

A hard disk drive 1 has a structure that a disk 2 provided on both surfaces with magnetic recording surfaces which can record information, a spindle motor 3 which rotates and drives the disk 2, a voice coil motor (VCM) 4 as an actuator for coarse motion which rotates and drives a magnetic head mounted on the tip of an arm in a predetermined region of the disk 2 so as to intersect with a track direction of the disk 2, and a carriage 5 which receives a driving force of the voice coil motor 4 are contained in a housing. The carriage 5 is rotatably attached to a pivot bearing 7 in a predetermined angle region around the pivot bearing 7. The carriage 5 includes a carriage arm 6 extended from a base portion of the carriage engaged with the pivot bearing 7, and to the tip of the carriage arm 6, a head-gimbal assembly 10 (a suspension) is fixed. Further, to the tip of the head-gimbal assembly 10, a slider 11 containing the magnetic head is fixed.

In the shown example, a pair of carriage arms 6 are superimposed on each other with such a space being left therebetween that the disk 2 can be interposed between the arms in a vertical direction (an axial direction of the spindle motor 3 or the pivot bearing 7) with respect to the base portion of the carriage engaged with the pivot bearing 7, and the magnetic head contained in the slider 11 of the head-gimbal assembly 10 fixed to each of the carriage arms 6 faces the magnetic recording surface (the disk surface) which is the upper surface (the front surface) or the lower surface (the back surface) of the disk 2. The carriage 5 is operated by the voice coil motor 4 to rotate in the predetermined angle region around the pivot bearing 7, whereby an arm of a VCM actuator including the carriage arm 6 and the head-gimbal assembly swings in a diametric direction on the disk surface, to position the magnetic head at an arbitrary radial position on the disk 2.

Figure 2:
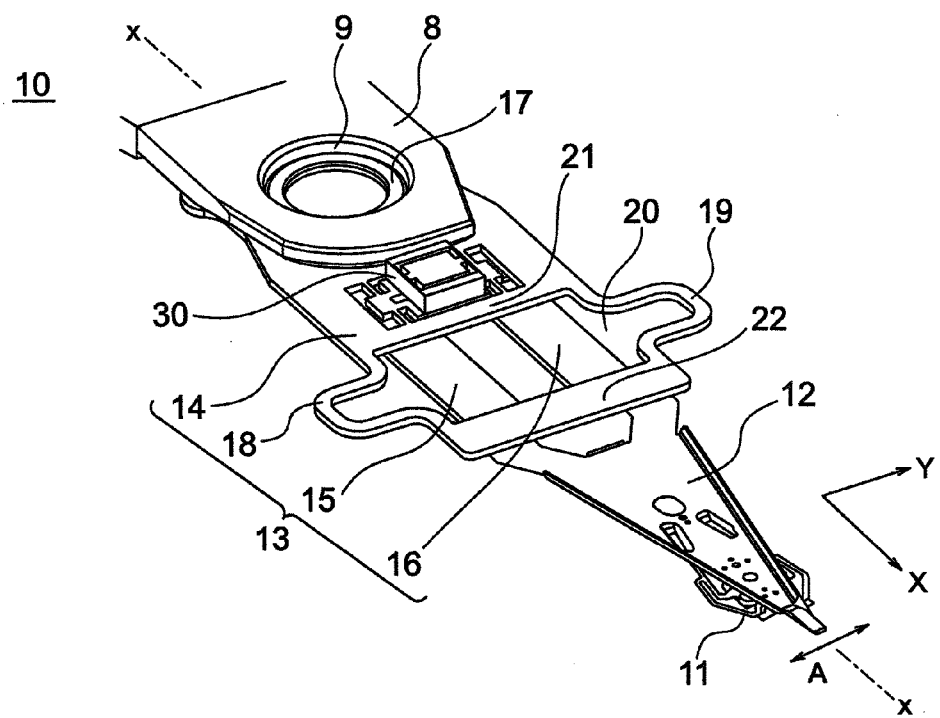
FIG. 2 is an enlarged view of a head-gimbal assembly shown in FIG. 1.

FIG. 2 is an enlarged view of the head-gimbal assembly shown in FIG. 1.

The head-gimbal assembly 10 has a constitution in which a load beam 12 including the slider 11 containing the magnetic head on the side of the tip thereof is fixed to an attachment base 8 formed integrally with the tip of the carriage arm 6 via an actuator 13 for micromotion. The actuator 13 for micromotion has a constitution in which a pair of piezoelectric elements 15 and 16 having mutually different polarizing directions are assembled onto a mount plate 14. The mount plate 14 is provided with a ring-like projection 17 fitted and fixed into an attachment hole 9 formed in the attachment base 8 at the tip of the carriage arm 6, on one side of the plate in a longitudinal direction thereof. On the other side of the plate in the longitudinal direction thereof, ends of a pair of flexible arm portions 18 and 19 each having an intermediate portion projecting outwardly in a lateral direction and having a bent shape which can extend in the longitudinal direction are connected to each other, thereby forming a hollow portion 20. The pair of piezoelectric elements 15 and 16 have both ends fixed to connecting portions 21 and 22 having rigidity, respectively, so as to bridge the hollow portion 20 on both end sides of the flexible arm portions 18 and 19, and the elements are arranged in the hollow portion 20 line-symmetrically with respect to a center line x-x in a longitudinal direction X of the mount plate 14. The load beam 12 has a base end side portion fixed to the connecting portion 22 on the other end side of the mount plate 14.

Consequently, in the actuator 13 for micromotion, the pair of piezoelectric elements 15 and 16 having mutually different polarizing directions mutually elongate and contract by a control signal, whereby the flexible arm portions 18 and 19 are, accordingly, deformed, and the connecting portion 22 and the load beam 12 swing with respect to the connecting portion 21 of the mount plate 14 around the center line x-x in the longitudinal direction X of the mount plate 14. In consequence, the magnetic head contained in the slider 11 on the side of the tip of the load beam 12 is driven in such a shown direction A in the drawing as to intersect with the track direction of the disk 2.

Furthermore, in the hard disk drive 1 of the present embodiment, a damping unit 30 is disposed in a connecting portion 21 part on one end side of the mount plate 14 which is a part of the mount plate 14 between the attachment hole 9 and the hollow portion 20.

Figure 3:
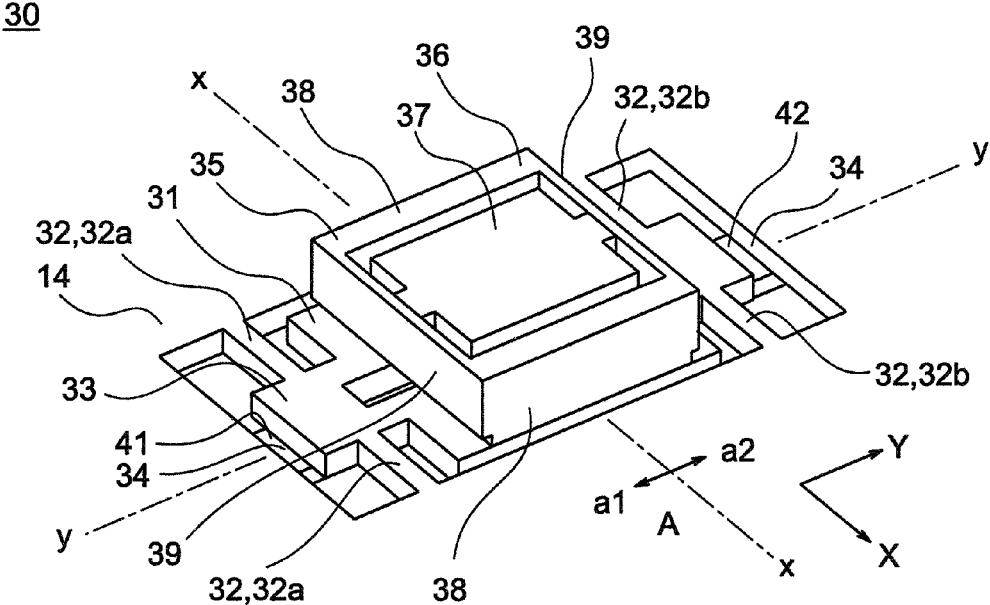
FIG. 3 is a perspective view showing a damping unit of FIG. 2 as seen from a side opposite to a disk surface.

FIG. 3 is a perspective view showing the damping unit of FIG. 2 as seen from a side opposite to a disk surface.

Figure 4:
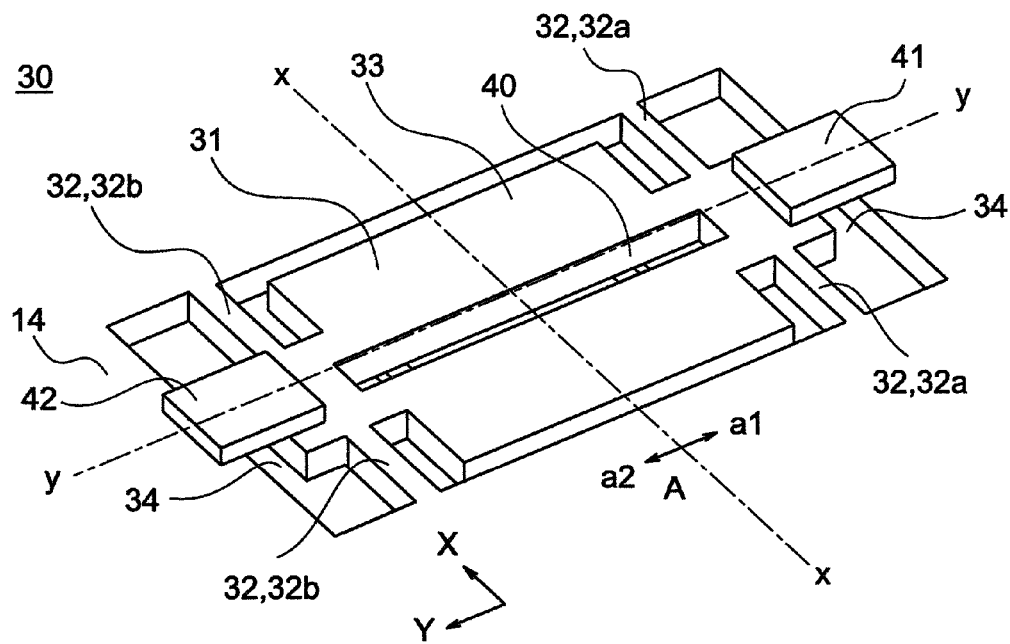
FIG. 4 is a perspective view showing the damping unit of FIG. 2 as seen from a disk surface side.

FIG. 4 is a perspective view showing the damping unit of FIG. 2 as seen from a disk surface side.

The damping unit 30 includes a base portion 31 supported by the mount plate 14, a resonator 35 mounted on the base portion 31, and a pair of piezoelectric elements 41 and 42 having mutually different polarizing directions.

In the shown example, the base portion 31 is formed by processing the mount plate 14, and includes four beam portions 32 and a plate-like mount portion 33 connected to the mount plate 14 via the four beam portions 32. Each of the four beam portions 32 has a constitution as a spring portion having a flexibility in a lateral direction Y of the mount plate 14 which is vertical to a center line x-x in a longitudinal direction X of the mount plate 14. Furthermore, in the shown example, the four beam portions 32 are two pairs of beam portions 32a and 32a and beam portions 32b and 32b, and the pairs of beam portions 32a and 32a and beam portions 32b and 32b are arranged symmetrically on both sides of the lateral direction Y of the mount plate 14, across the center line x-x along the longitudinal direction X of the mount plate 14. The beam portions 32a and 32a or the beam portions 32b and 32b of each pair are symmetrically arranged on both sides of the center line x-x along the longitudinal direction X of the mount plate 14, across a center line y-y of the mount portion 33 in the lateral direction Y of the mount plate 14. Moreover, the mount portion 33 is formed as a rigid plate-like portion having a shape which is line-symmetric with respect to the center line x-x along the longitudinal direction X of the mount plate 14, and between both the ends of the mount portion 33 along the lateral direction Y of the mount plate 14 and the mount plate 14, space portions 34 and 34 are formed to allow the movement of the mount portion 33 along the lateral direction Y of the mount plate 14.

On the other hand, the resonator 35 includes a rectangular frame 36 and a mass member 37 received in the frame 36. The frame 36 includes a pair of rigid leg portions 38 and 38 fixed to the base portion 31 and extending in parallel to the lateral direction Y of the mount plate 14, and a pair of flexible connecting portions 39 and 39 formed as leaf springs in the lateral direction Y of the mount plate 14 which are not fixed to the base portion 31, connect both end sides of the leg portions 38 and 38 to each other and extend in parallel to the longitudinal direction X of the mount plate 14. The mass member 37 received in the frame 36 is made of a rigid material having a shape which is line-symmetric with respect to the center line y-y of the mount portion 33. In addition, the ends of the mass member 37 in the lateral direction Y of the mount plate 14 are secured to the facing connecting portions 39 and 39, respectively, whereas the ends of the mass member in the longitudinal direction X of the mount plate 14 are not secured to the leg portions 38 and 38, whereby the connecting portions 39 and 39 are bent and deformed to allow the movement of the mass member 37 along the lateral direction Y of the mount plate 14 in the frame 36. It is to be noted that a groove formed in the mount portion 33 of the base portion 31 and extending along the lateral direction Y of the mount plate 14 is a guide groove 40 which guides the movement of the mass member 37 in the lateral direction Y of the mount plate 14.

With respect to the base portion 31 on which the resonator 35 is mounted, both ends of the pair of piezoelectric elements 41 and 42 are fixed to the ends of the mount portion 33 along the lateral direction Y of the mount plate 14 and to the mount plate 14, respectively, so as to bridge the space portions 34 and 34. In consequence, when the piezoelectric elements 41 and 42 elongate and contract by a driving voltage, respectively, the mount portion 33 of the base portion 31 deforms the flexible beam portions 32 to move in the lateral direction Y of the mount plate 14, i.e., a driving direction A of the magnetic head, whereby the mass member 37 of the resonator 35 relatively moves with respect to the mount portion 33 in the direction A and in a direction opposite to the moving direction of the mount portion 33.

FIG. 5 and FIG. 6 are operation explanatory views of the damping unit shown in FIG. 3 and FIG. 4.

As shown in FIG. 5, the piezoelectric elements 41 and 42 have mutually reverse polarizing directions. Therefore, when a repeating driving voltage having the same voltage polarity or size is applied, the one piezoelectric element 41 or the other piezoelectric element 42 elongates, and the other piezoelectric element 42 or the one piezoelectric element 41 contracts, to perform a push-pull operation. Consequently, the beam portions 32 of the base portion 31 are elastically deformed, and the mount portion 33 is displaced in the arrow direction A. In consequence, when the repeating driving voltage having a predetermined frequency (the alternate voltage) is applied to the piezoelectric elements 41 and 42, the mount portion 33 of the base portion 31 is driven and vibrated in the shown direction A so as to intersect with the track direction of the disk 2.

In this way, when the mount portion 33 of the base portion 31 is displaced by applying the repeating driving voltage to the piezoelectric elements 41 and 42 of the base portion 31, the resonator 35 is vibrated. In this case, the connecting portions 39 and 39 as the leaf springs are noticeably bent, and the mass member 37 is relatively displaced along the shown direction A so as to intersect with the track direction of the disk 2. Here, a characteristic frequency of the resonator 35 determined by a spring constant of the connecting portions 39 and 39 and a mass of the mass member 37 is set to be higher than a frequency of a resonance peak which is a compensation object of the damping unit, i.e., a control frequency, and set to a frequency which is within twice the frequency of the control object. Moreover, a spring constant of the beam portions 32 (32a and 32a, and 32b and 32b) which are springs of the base portion 31 is set to be higher than the spring constant of the connecting portions 39 and 39 which are the leaf springs of the resonator 35. Therefore, owing to the displacement of the mount portion 33 of the base portion 31, the mass member 37 can noticeably be displaced. Moreover, a displacement direction of the base portion 31 matches a displacement direction of the mass member 37. That is, by the operation of the resonator 35, the displacement of the mass member 37 in the shown direction A is enlarged as compared with the displacement of the mount portion 33 of the base portion 31. As seen from an aspect of a function of the damping unit 30 which damps a vibration of a mounted material by a reactive force obtained by the operation of the mass member 37, a larger reactive force can be obtained by the enlarged displacement. In other words, it is seen that an equivalent vibration damping effect can be obtained by use of the mass member 37 having a smaller mass.

Figure 7:
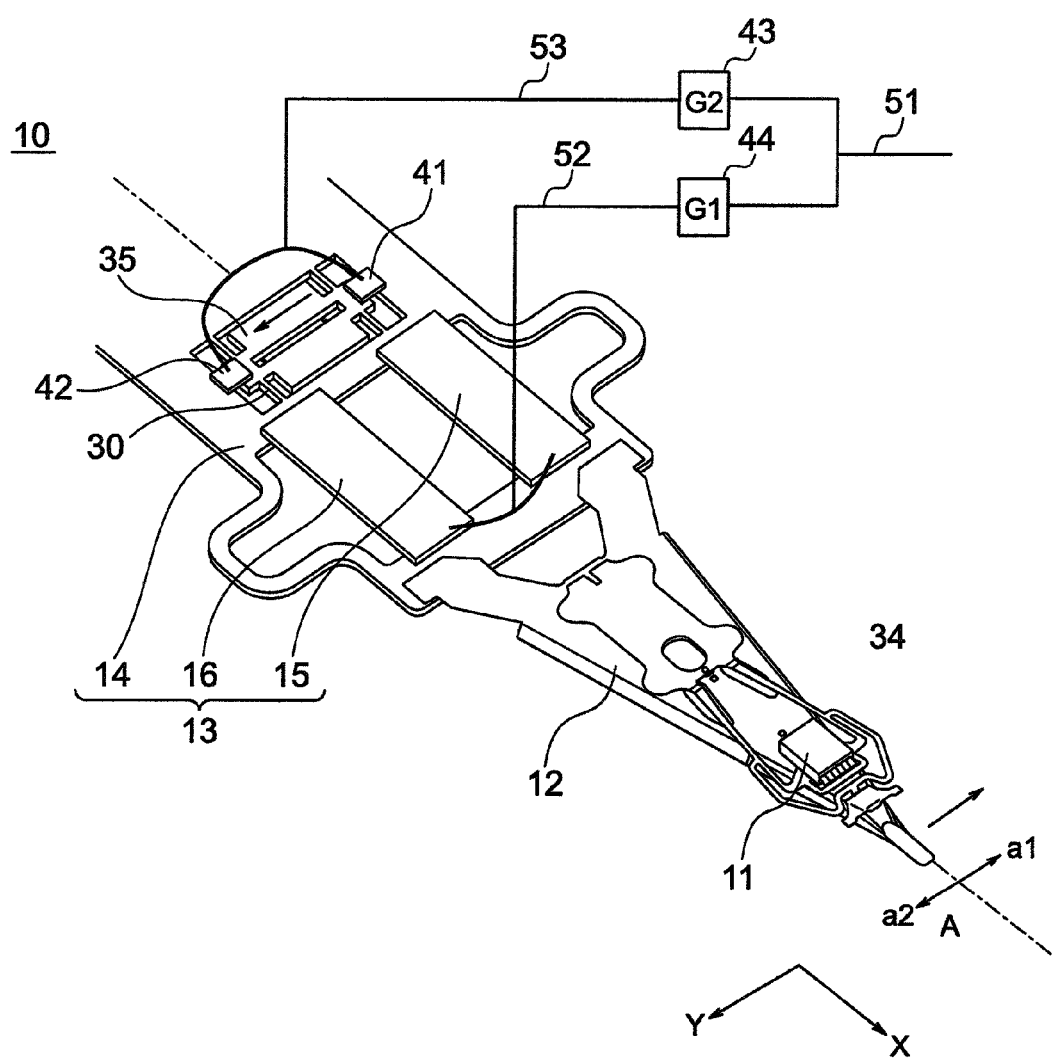
FIG. 7 is an operation explanatory view of the head-gimbal assembly of the hard disk drive according to the present embodiment.

FIG. 7 is an operation explanatory view of the head-gimbal assembly of the hard disk drive according to the present embodiment. It is to be noted that in FIG. 7, unlike FIG. 1 seen from the side opposite to the disk surface, the head-gimbal assembly 10 has a state seen from the disk surface side.

In the shown example, gains G1 and G2 are independently applied to a control signal 51 by amplifiers 43 and 44, respectively, to generate a driving voltage 52 of the piezoelectric elements 15 and 16 of the actuator 13 for micromotion and a driving voltage 53 of the piezoelectric elements 41 and 42 of the damping unit 30. When the slider 11 is displaced in a direction a1 by the operation of the actuator 13 for micromotion, the damping unit 30 is displaced in an opposite direction a2.

Hereinafter, the results of comparison evaluation of the hard disk drive 1 of the present embodiment having the above constitution with respect to a conventional hard disk drive will be described. In this comparison evaluation, the carriage 5 shown in FIG. 8 is applied to the hard disk drive 1 of the present embodiment, while the hard disk drive according to a conventional technology includes a carriage 105 shown in FIG. 9.

Figure 8:
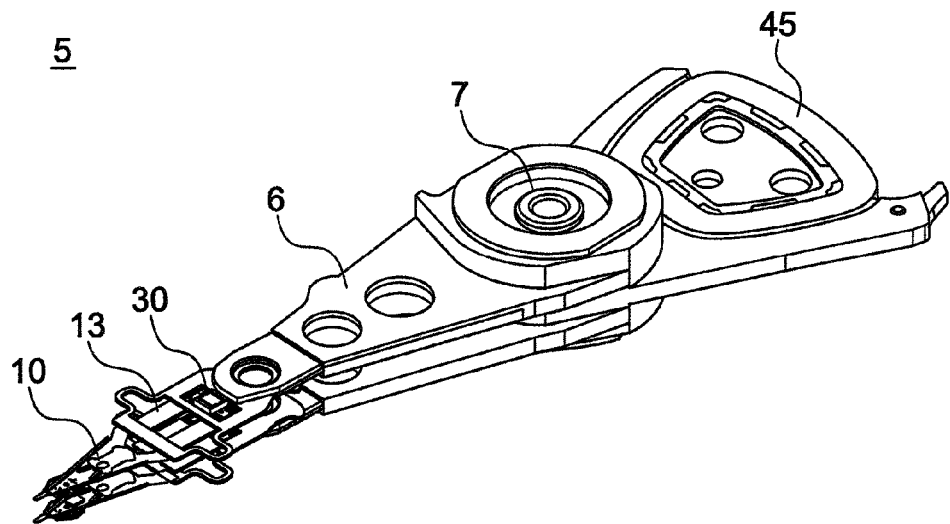
FIG. 8 is a perspective view of a carriage of the hard disk drive according to the present embodiment.

FIG. 8 is a perspective view of the carriage of the hard disk drive according to the present embodiment.

In FIG. 8, the arm of the VCM actuator including the carriage arm 6 and the head-gimbal assembly 10 of the carriage 5 is provided with the actuator 13 for micromotion, the damping unit 30 and a VCM coil 45. It is to be noted that since the constitution of the head-gimbal assembly 10 including the actuator 13 for micromotion and the damping unit 30 has been described above in detail with reference to FIG. 1 to FIG. 7, the same constitution is denoted with the same reference numerals, thereby omitting description thereof.

Figure 9:
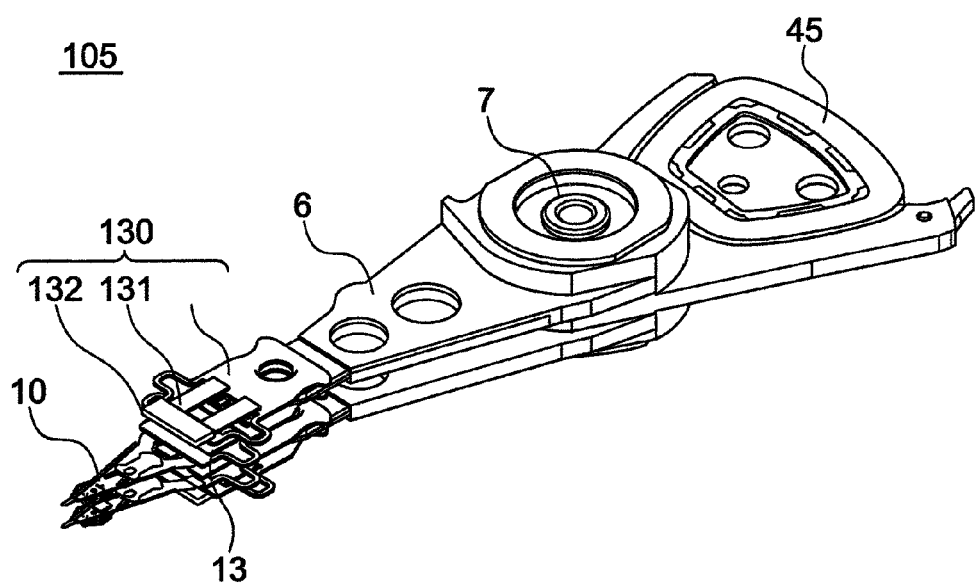
FIG. 9 is a perspective view of a carriage of a conventional hard disk drive according to a comparative example.

FIG. 9 is a perspective view of the carriage of the conventional hard disk drive according to a comparative example.

In FIG. 9, the arm of the VCM actuator including the carriage arm 6 and the head-gimbal assembly 10 of the carriage 105 is provided with the actuator 13 for micromotion, a balance driving mechanism 130 and the VCM coil 45. The balance driving mechanism 130 includes a microactuator 131 having a constitution similar to the actuator 13 for micromotion which finely moves the head-gimbal assembly (the suspension) 10, and a mass member (a dummy mass) 132 which has a mass equivalent to that of the head-gimbal assembly (the suspension) 10 including the mounted magnetic head and finely moves by the driving of the microactuator 131. Owing to the driving of the actuator 13 for micromotion and the microactuator of the balance driving mechanism 130 in opposite phases, respectively, it is possible to obtain an effect similar to that of the arm of the VCM actuator on which two magnetic heads are mounted.

Figure 10:
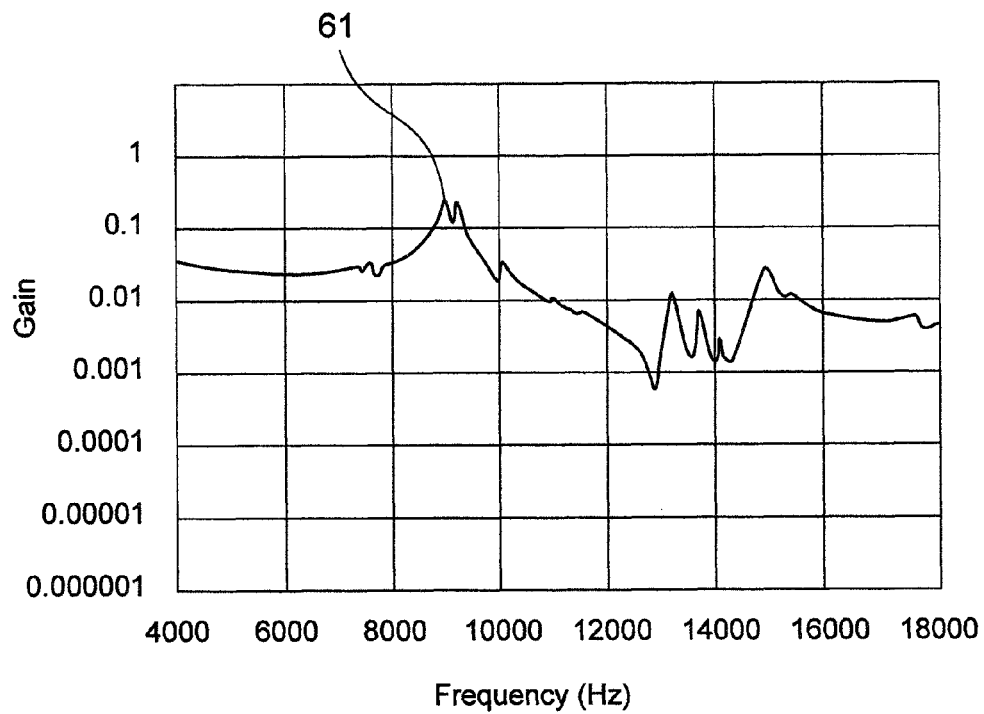
FIG. 10 shows calculated frequency characteristics of the carriage of the hard disk drive according to the present embodiment shown in FIG. 8.

FIG. 10 shows calculated frequency characteristics of the carriage of the hard disk drive according to the present embodiment shown in FIG. 8. A solid line shows gain characteristics. For the calculation, both ends of the pivot bearing 7 were fixed, an exciting force was input into the VCM coil 45 in such a direction as to rotate the carriage 5 around the pivot bearing 7, and a frequency response of the displacement at a magnetic head position was calculated by a finite element method.

Moreover, a weight of the suspension part (the head-gimbal assembly) 10 driven by the microactuator (the actuator for micromotion) 13 was 8 mg, a weight of the mass member 37 of the damping unit 30 (see FIG. 3) was 1 mg, and a weight of the whole damping unit 30 was 2 mg.

Figure 11:
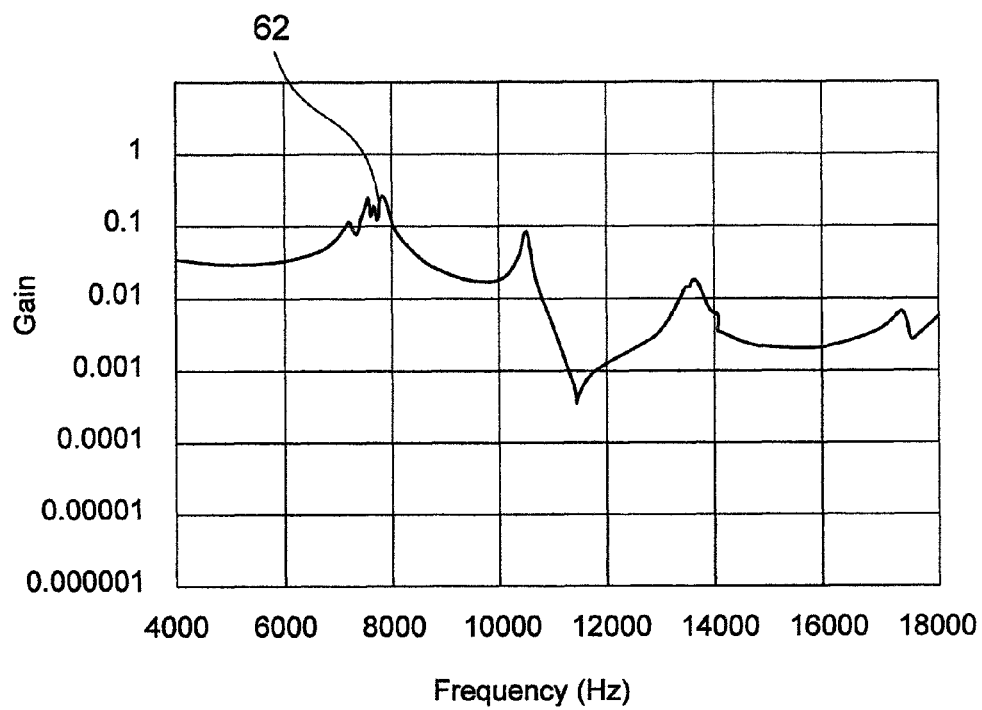
FIG. 11 shows calculated frequency characteristics of the carriage of the conventional hard disk drive according to the comparative example shown in FIG. 9.

FIG. 11 shows calculated frequency characteristics of the carriage of the conventional hard disk drive according to the comparative example shown in FIG. 9. A solid line shows gain characteristics. For the calculation, both ends of the pivot bearing 7 were fixed, an exciting force was input into the VCM coil 45 in such a direction as to rotate the carriage 105 around the pivot bearing 7, and a frequency response of the displacement at a magnetic head position was calculated. Moreover, a weight of the suspension part 10 driven by the microactuator 13 was 8 mg. Here, a weight of the balance driving mechanism 130 including the mass member (the dummy mass) 132, the microactuator (the piezoelectric element) 131 and a mount plate 114 on which the mass member and the microactuator were mounted was 43 mg.

When FIG. 10 is compared with FIG. 11, as to frequencies of peaks 61 and 62 in a primary resonance mode having the lowest frequency, the peak 61 in the present embodiment shown in FIG. 10 is 9 kHz, whereas the peak 62 in the comparative example shown in FIG. 11 is 7.8 kHz. It is seen that as compared with the conventional technology, in the present embodiment, the primary resonance frequency of the carriage 5 of the VCM actuator as an actuator for coarse motion increases by about 15%.

Figure 12:
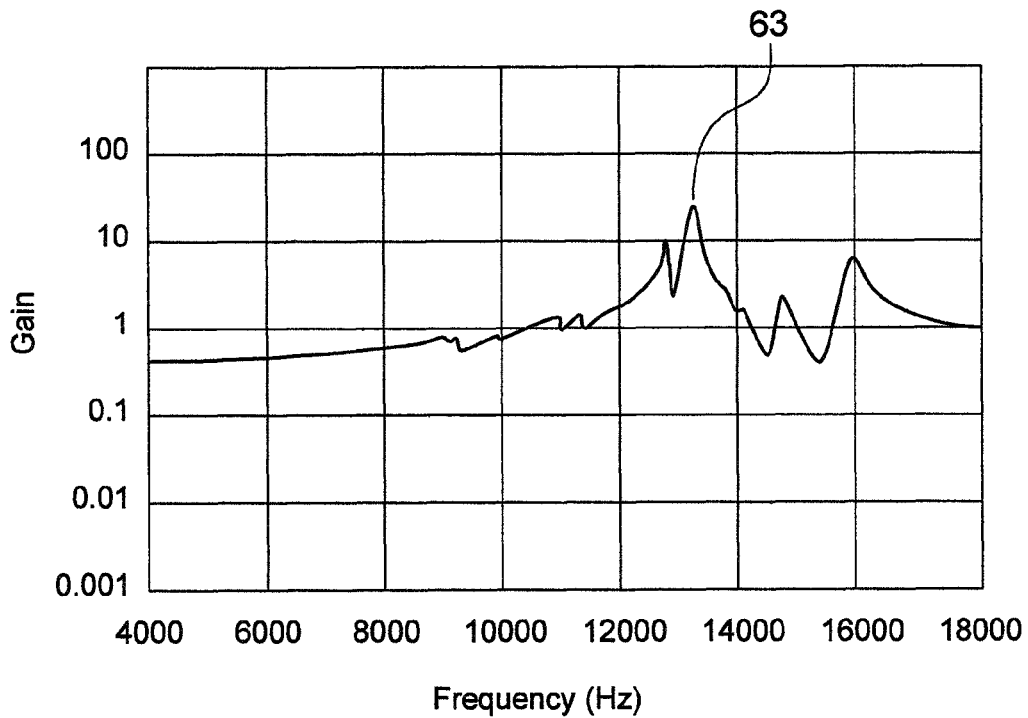
FIG. 12 shows a calculated frequency response at a position of a magnetic head in a case where an only microactuator is operated in the carriage of the hard disk drive of the present embodiment shown in FIG. 8.

FIG. 12 shows a calculated frequency response at a position of a magnetic head in a case where the only microactuator (the actuator for micromotion) 13 is operated in the carriage of the hard disk drive of the present embodiment shown in FIG. 8. A peak 63 is a peak of a sway mode disclosed in JP-B-3771076, and a function of the damping unit 30 according to the conventional technology and the present technology is to suppress the sway mode which appears as the peak 63, thereby improving vibration characteristics.

Figure 13:
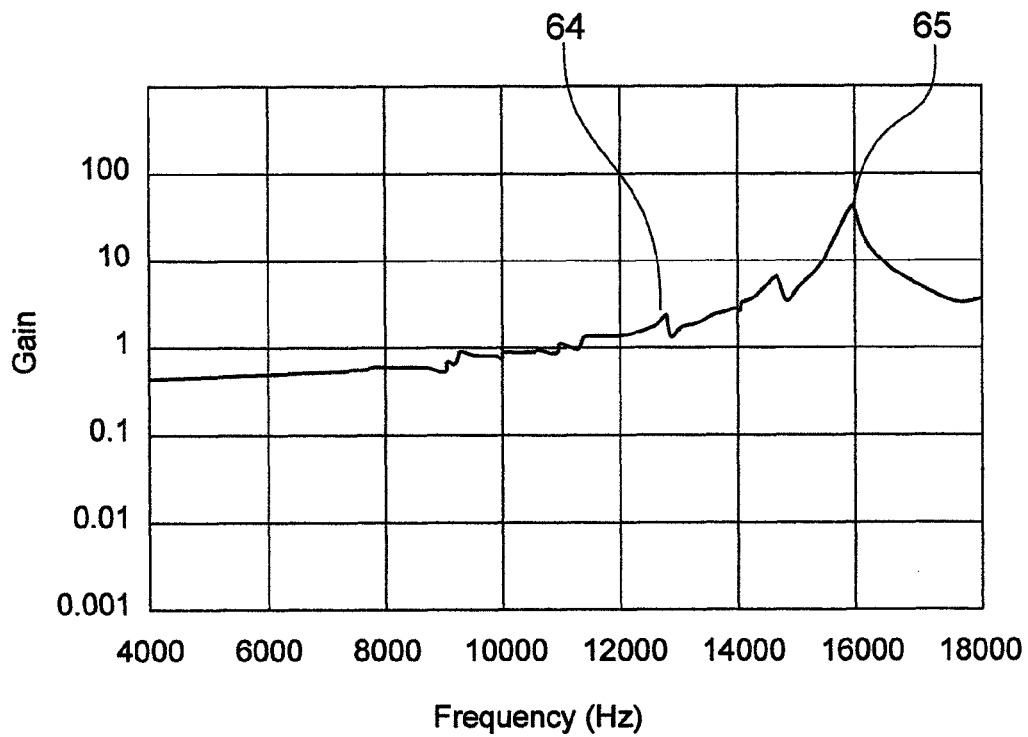
FIG. 13 shows a calculated frequency response at the position of the magnetic head in a case where the microactuator and the damping unit are operated in the carriage of the hard disk drive of the present embodiment shown in FIG. 8.

FIG. 13 shows a calculated frequency response at the position of the magnetic head in a case where the microactuator (the actuator for micromotion) 13 and the damping unit 30 are operated in the carriage of the hard disk drive of the present embodiment shown in FIG. 8. A peak 64 of the sway mode is substantially suppressed, and a peak of the lowest frequency in a frequency response shifts to a peak 65. In consequence, the frequency of the peak of the lowest frequency improves by about 20% from the peak 63 or 64 of 13 kHz to the peak 65 of 16 kHz.

It is seen from the results of FIG. 10 to FIG. 13 that both the primary resonance frequency of the microactuator which is the actuator 13 for micromotion according to the present invention and the primary resonance frequency of the carriage 5 which is the actuator for coarse motion are enhanced. In consequence, the control band of both the coarse motion and the micromotion can be enhanced, and a higher positioning precision can be realized.

Figure 14:
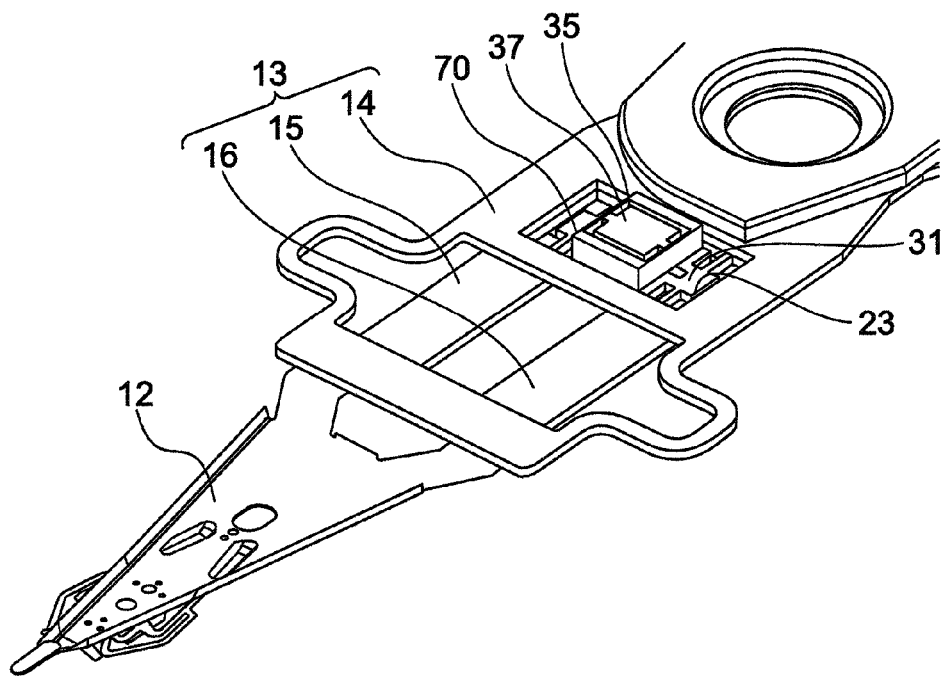
FIG. 14 is a perspective view of a head-gimbal assembly of another embodiment of the present invention.

FIG. 14 is a perspective view of a head-gimbal assembly of another embodiment of the present invention.

Figure 15:
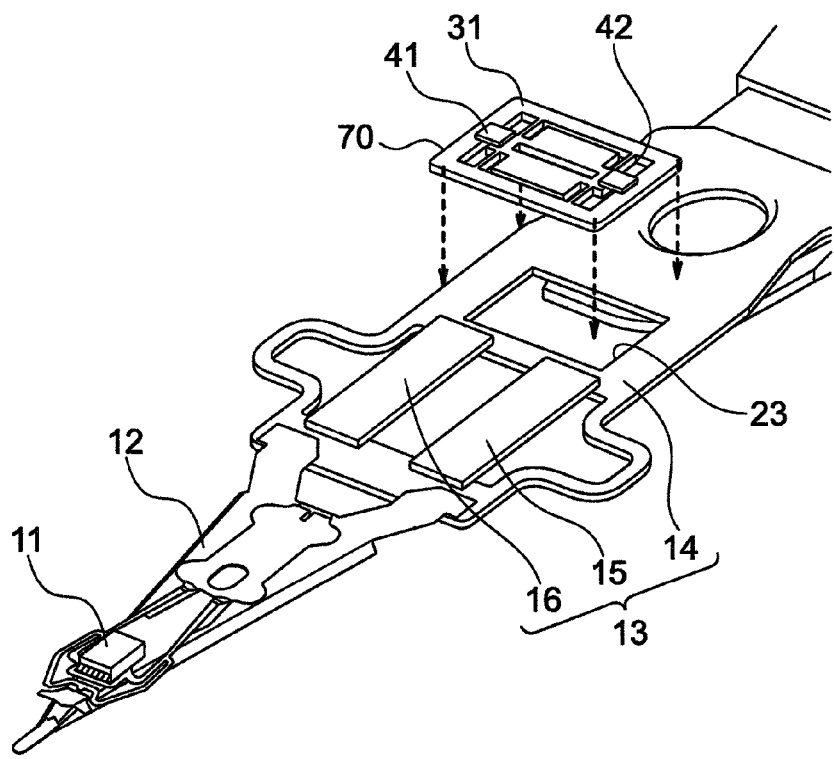
FIG. 15 is an exploded perspective view showing the head-gimbal assembly of FIG. 14 as seen from the backside.

FIG. 15 is an exploded perspective view showing the head-gimbal assembly of FIG. 14 as seen from the backside (a disk surface side).

In the present embodiment, a damping unit including a base portion 31, a resonator 35 and a pair of piezoelectric elements 41 and 42 in the same manner as in the damping unit 30 shown in FIG. 3 and FIG. 4 has a constitution of a damping unit 70 as an assembly which can preliminarily be assembled, and the damping unit 70 can be joined to a mount plate 14 provided with an actuator 13 for micromotion. For example, to join the damping unit 70 to the mount plate 14, the mount plate 14 is provided with an attachment hole 23 having a size corresponding to a size of the base portion 31 and the resonator 35 of the damping unit 70, and a non-movable/non-deformable constituent part of the damping unit 70 may be joined to a plate portion around the attachment hole 23 by an adhesive or welding.

In the present embodiment, when the damping unit 30 has the constitution of the assembly including the damping unit 70 as described above, the microactuator 13 required to be finely processed or assembled in the same manner as in the damping unit 30 can separately be processed, whereby a precision or a yield can be improved.

Moreover, in the above embodiments, the hard disk drive including the suspension driving type microactuator as the actuator 13 for micromotion has been illustrated, but the present invention can be applied to a hard disk drive including a slider driving type microactuator which drives the slider 11.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A hard disk drive comprising:
    a disk which records information;
    a magnetic head which reads and writes the information from and to the disk;
    a head-gimbal assembly which supports the magnetic head;
    a support arm which supports the head-gimbal assembly;
    a coarse motion actuator which displaces and drives the support arm in such a direction as to intersect with a track direction of the disk; and
    a micromotion actuator for micromotion displacement which finely displaces and drives the head-gimbal assembly in such a direction as to intersect with the track direction of the disk,
    said hard disk drive further comprising:
    a damping unit including:
    a resonator in which a mass member is elastically supported to be displaceable in a predetermined direction,
    a base portion in which a mount portion including the mounted resonator is elastically supported to be displaceable in the predetermined direction, and
    a micromotion actuator for damping which displaces and drives the mount portion of the base portion in the predetermined direction,
    wherein the damping unit is disposed in the head-gimbal assembly so that the predetermined direction of the damping unit becomes the same as a displacement direction of the magnetic head by the driving of the micromotion actuator, and
    wherein the micromotion actuator for micromotion displacement drives the head-gimbal assembly, the micromotion actuator for damping drives the damping unit so that the micromotion displacement direction of the magnetic head and the displacement direction of the mount portion have opposite phases.

2. The damping unit according to claim 1, wherein in the resonator, the mass member is elastically supported by a first spring member in the predetermined direction,
    in the base portion, the mount portion is elastically supported by a second spring member in the predetermined direction,
    a spring constant of the first spring member is larger than a spring constant of the second spring member, and
    a resonance frequency determined by the mass member and the second spring member is higher than a frequency of a resonance peak of an object of compensation by the damping unit.

* * * * *